No. 787,679. PATENTED APR. 18, 1905.
W. E. KOCH.
FISH HOOK.
APPLICATION FILED NOV. 30, 1904.
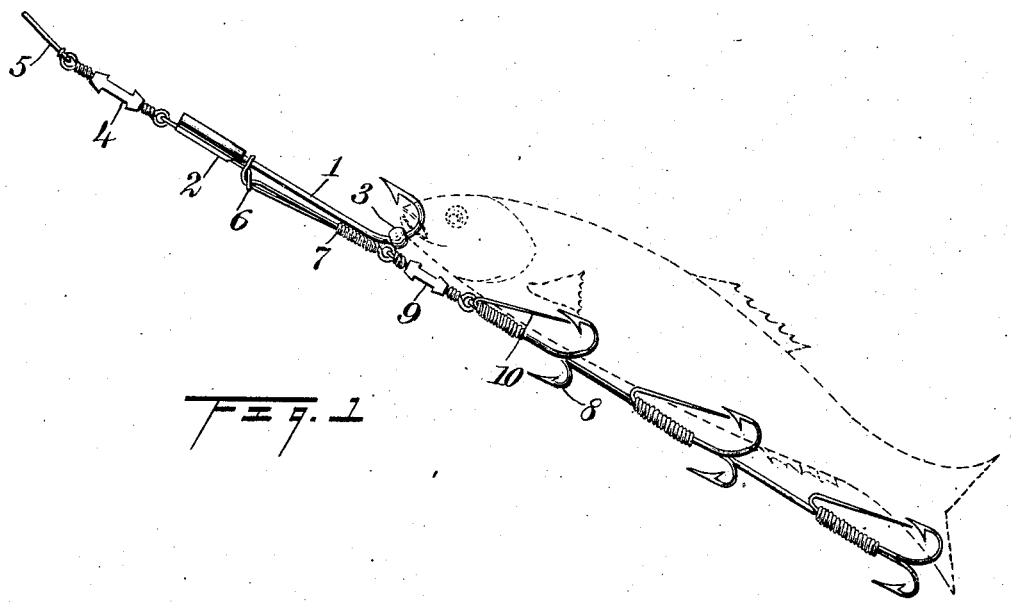
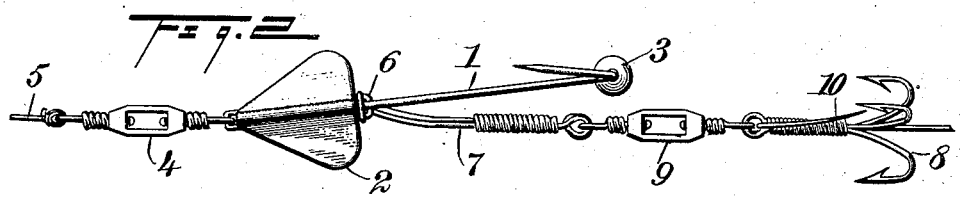
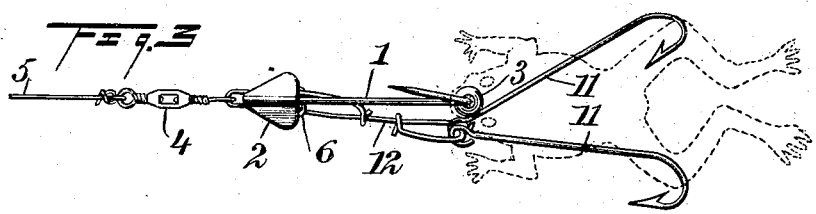
WITNESSES:
INVENTOR
William E. Koch
BY Munn & Co
ATTORNEYS No. 787,679.

Patented April 18, 1905.

UNITED STATES PATENT OFFICE.

WILLIAM EDWARD KOCH, OF WHITEHALL, NEW YORK.

FISH-HOOK.

SPECIFICATION forming part of Letters Patent No. 787,679, dated April 18, 1905.

Application filed November 30, 1904. Serial No. 234,868.

*To all whom it may concern:*

Be it known that I, WILLIAM EDWARD KOCH, a citizen of the United States, and a resident of Whitehall, in the county of Washington and State of New York, have invented a new and Improved Fish-Hook, of which the following is a full, clear, and exact description.

This invention relates particularly to improvements in fish-hooks of the gang type used for trolling, an object being to provide in connection with a main hook a simple means for attaching an auxiliary or gang of hooks thereto, the connection between the parts being such as to cause the bait-minnow, either alive or dead, to float in an upright and natural position.

I will describe a fish-hook embodying my invention and then point out the novel features in the appended claims.

Reference is to be had to the accompanying drawings, forming a part of this specification, in which similar characters of reference indicate corresponding parts in all the figures.

Figure 1 is a side view of a fish-hook embodying my invention. Fig. 2 is a plan thereof, showing a slight modification with a portion of the gang omitted; and Fig. 3 is a plan showing another modification.

Referring to the drawings, 1 designates the main fish-hook, on the shank of which is a plate 2, the said plate being of substantially triangular form with one of its straight edges toward the bend of the hook, and this plate is arranged at right angles to the bend of the hook with equal portions extended at opposite sides of the hook-shank. Also arranged on the hook and adapted to slide thereon is a sinker 3, which serves to incline the plate 2, and the pressure on the under side of this plate caused by the sinker 3 forces the plate 2 against the water when the hook is drawn along below the surface, causing the bend and point of the hook to travel in a continuous vertical plane, and as the minnow is hooked through the center of both lips it cannot turn over. Connected to the shank of the hook above the plate 2 is a swivel 4, to which the line 5 is attached. This permits the hook to maintain its proper inclined position when drawn through the water. Connected to the lower portion of the plate 2 is a loop 6, to which the snell, consisting of wire or other suitable material 7, is attached, to which a gang of hooks 8 is attached, and arranged in the snell is a swivel 9, which permits the main hook to act independently of the gang of hooks 8 and allows a slight lateral motion of the snell 7 relatively to the main hook to overcome or break any sidewise pressure of the snell caused by kinks or bends therein, which pressure would tend to upset the bait. In Fig. 1 I have shown the hooks on the gang as arranged in pairs, and coacting with a hook on each pair is a bait-needle 10.

In Fig. 2 there are three hooks shown in connection, and in Fig. 3 two hooks 11 are indicated as connected, by means of a wire 12, with the loop 6. This form of the device is designed for use when a frog is employed for bait, and the method of securing the frog is clearly indicated by dotted lines in said Fig. 3, and the dotted lines in Fig. 1 also clearly show the method of securing a minnow to the gang.

It will be seen that by means of the loop 6 a gang of hooks may be readily connected to the main hook and as readily removed therefrom.

Having thus described my invention, I claim as new and desire to secure by Letters Patent—

1. A fish-hook, a plate secured to the shank thereof, and a loop below the plate to which a gang of hooks may be connected.

2. A main fish-hook, a loop, a gang of hooks for connection with said loop, and a swivel in said connection.

3. A main fish-hook, a line-attaching swivel on the hook, and a gang-attaching loop below the swivel.

4. A main fish-hook, a line-attaching swivel on the hook, a gang-attaching loop, and a plate between the swivel and loop.

5. A main fish-hook, a line-attaching swivel on the hook, a gang-attaching loop below the swivel, and a sinker on the hook.

6. A main fish-hook, a line-attaching swivel thereon, a plate on the hook-shank, a loop extended from said plate toward the bend of the hook, and a sinker movable on the hook.

7. A main fish-hook, a plate attached to the shank thereof, the plane of said plate being at right angles to the bend of the hook, and a loop on the lower end of said plate.

8. A main fish-hook, a plate of substantially triangular form secured to the shank of the hook with one of its straight edges toward the bend, a loop on the plate at said straight edge, and a line-attaching swivel on the shank.

In testimony whereof I have signed my name to this specification in the presence of two subscribing witnesses.

WILLIAM EDWARD KOCH.

Witnesses:
 WM. KOCH,
 JULIA M. KOCH.